United States Patent Office 3,364,047
Patented Jan. 16, 1968

3,364,047
ESTERS OF POLYETHER-POLYOLS AND CURABLE COMPOSITIONS THEREOF
Charles W. McGary, Jr., Charleston, W. Va., assignor to Union Carbide Corporation, a corporation of New York
No Drawing. Continuation-in-part application Ser. No. 137,498, Sept. 12, 1961. This application Dec. 13, 1965, Ser. No. 513,568
4 Claims. (Cl. 106—287)

This application is a continuation-in-part of application Ser. No. 137,498, filed Sept. 12, 1961, now U.S. Patent 3,256,342.

The invention relates to a novel class of polymers. In a particular aspect, the invention relates to novel derivatives of polyether-polyols. More particularly, the invention relates to the aliphatic monocarboxylic acid esters of said polyether-polyether-polyols, and to curable compositions which can be prepared from certain of said esters.

The polyether-polyols from which the esters of the invention are derived are compositions that have the recurring structural unit that is represented by Formula I:

(I) 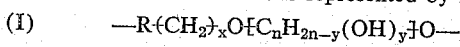

wherein $x$ is zero or one, wherein $n$ is an integer having a value of from 3 to 8, wherein $y$ is one or two, and wherein R is either a bicyclo[2.2.1]-2,5(6)-heptylene group, i.e., a group having the structure:

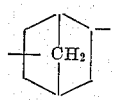

or a tetracyclo[6.2.1$^{1,8}$.1$^{3,6}$.0$^{2,7}$] - 4,9(10) - dodecylene group, i.e. a group having the structure:

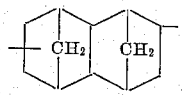

In Formula I supra, the group

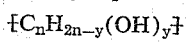

represents a hydroxy substituted divalent aliphatic hydrocarbon group which has from three to eight carbon atoms and which has either one or two hydroxyl group substituents. Examples of such groups include, among other, 2-hydroxy-1,3-propylene, 3-hydroxy-1,2-propylene, 2,3-dihydroxy - 1,4-butylene, 2,2-dimethylol-1,3-propylene, 3-methylol-1,5-pentylene, 2-(2-hydroxyethyl)-1,4-butylene, 5 - hydroxy-1,6-hexylene, 6-hydroxy-1,2-hexylene, 2-hydroxy-1,8-octylene, and the like.

The preferred polyether-polyols are those which have the recurring structural unit that is represented by Formula II:

(II) 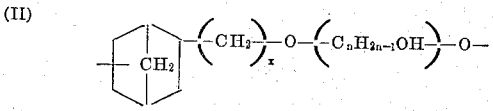

wherein $x$ represents zero or one, and wherein $n$ represents an integer in the range of from 3 to 8, and is most preferably, 3. In the above Formula II, the group

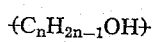

represents a divalent aliphatic hydrocarbon group which has one hydroxyl group substituent, and is illustrated by groups such as 2-hydroxy-1,3-propylene, 3-hydroxy-1,2-propylene, 3-methylol-1,3-propylene, 2-(2-hydroxyethyl)-1,4-butylene, 5-hydroxy-1,6-hexylene, 2-hydroxy-1,8-octylene, and the like.

The polyether-polyols employed in the invention can be prepared by heating, in the presence of an acid catalyst, a polyhydric alcohol that is represented by Formula III:

(III) 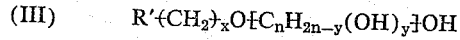

wherein $x$ is zero or one, wherein $n$ is an integer having a value of from 3 to 8, wherein $y$ is one or two, and wherein R' is either a bicyclo[2.2.1]-2-hepten-5-yl group, i.e., a group which has the structure:

or a tetracyclo[6.2.1$^{1,8}$.1$^{3,6}$.0$^{2,7}$]4-dodecen-9-yl group, i.e., a group which has the structure:

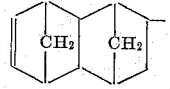

The polyhydric alcohol represented by Formula III supra is polymerized by a mechanism wherein one of the hydroxyl groups of a molecule of starting polyhydric alcohol adds across the olefinic double bond in another molecule of starting polyhydric alcohol. This reaction is then continued until a polymeric molecule is built up which comprises a chain of at least one and up to fifty units, or more, that are represented by Formula I supra, connected to one another, and wherein the chain is bonded at one end to a group that is represented by Formula IV:

(IV) 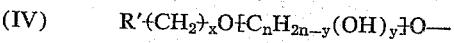

wherein R', $n$, $x$ and $y$ are as defined above with respect to Formula III, and wherein the chain is bonded at the other end to a hydrogen atom.

The polyhydric alcohols which are employed as the starting reactants to produce the above-described polyether-polyols fall into four general classes of compounds. The first class comprises those compounds which are represented by Formula V:

(V) 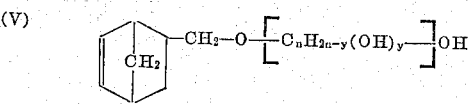

wherein $n$ is an integer having a value of from 3 to 8, and wherein $y$ is one or two. These compounds can be prepared by a Diels-Alder reaction between cyclopentadiene and the monoallyl ether of a polyhydric alcohol which has three or four hydroxyl groups. The following reaction between cyclopentadiene and the monoallyl ether of glycerine is illustrative of the preparation of the polyhydric alcohols that are represented by Formula V supra:

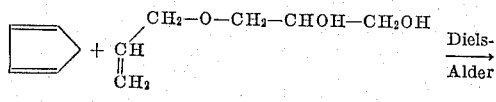

Examples of the polyhydric alcohols that are represented by Formula V supra include, among others, bicyclo [2.2.1]-2-hepten-5-ylmethyl 2,3-dihydroxypropyl ether, bicyclo[2.2.1] - 2 - hepten-5-ylmethyl 2,2-dimethylol-3-hydroxypropyl ether, bicyclo[2.2.1]-2-hepten-5-ylmethyl 5, 6-dihydroxyhexyl ether, bicyclo[2.2.1]-2-hepten-5-ylmethyl 2,3,4-trihydroxybutyl ether, bicyclo[2.2.1]-2-hepten-5-ylmethyl 3-methylol-5-hydroxypentyl ether, and the like.

A second class of polyhydric alcohols which can be employed to produce the polyether-polyols of the invention comprises those compounds that are represented by Formula VI:

(VI) 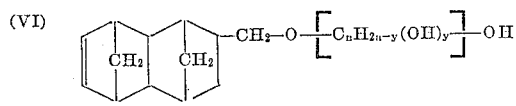

wherein $n$ is an integer having a value of from 3 to 8, and wherein $y$ is one or two. These polyhydric alcohols can be prepared by a Diels-Alder type reaction between cyclopentadiene and a polyhydric alcohol that is represented by Formula V, supra. Polyhydric alcohols which are represented by Formula VI include, among others, tetracyclo [6.2.1$^{1,8}$.1$^{3,6}$.0$^{2,7}$]-4-dodecen - 9 - ylmethyl 2,3-dihydroxypropyl ether, tetracyclo[6.2.1$^{1,8}$.1$^{3,6}$.0$^{2,7}$]-4-dodecen-9-ylmethyl 2,2-dimethylol-3-hydroxypropyl ether, tetracyclo[6.2.1$^{1,8}$.1$^{3,6}$.0$^{2,7}$]-4-dodecen-9-ylmethyl 5,6 - dihydroxyhexyl ether, tetracyclo [6.2.1$^{1,8}$.1$^{3,6}$.0$^{2,7}$]-4-dodecen-9-ylmethyl 2,6-dihydroxyhexyl ether, tetracyclo[6.2.1$^{1,8}$.1$^{3,6}$.0$^{2,7}$]-4-dodecen-9-ylmethyl 3-methylol - 5 - hydroxypentyl ether, tetracyclo[6.2.1$^{1,8}$.1$^{3,6}$.0]-4-dodecen - 9 - ylmethyl 2,3,4-trihydroxybutyl ether, and the like.

A third class of polyhydric alcohols which can be employed to prepare the polyether-polyols of the invention comprises the compounds that are represented by Formula VII:

(VII) 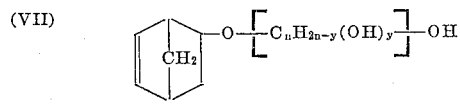

wherein $n$ is an integer having a value of from 3 to 8, and wherein $y$ is one or two. These alcohols can be prepared by the following sequence of reactions:

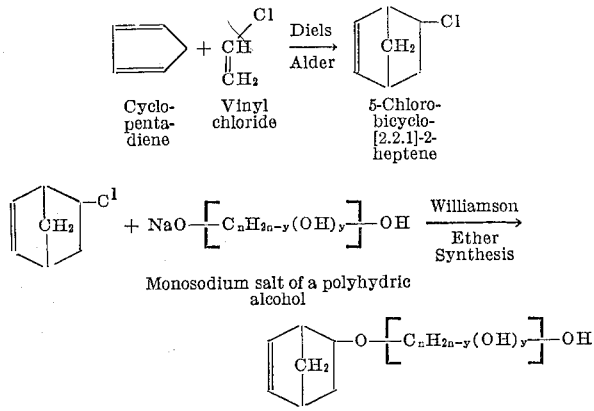

Examples of the polyhydric alcohols that are represented by Formula VII supra, include, among others, bicyclo[2.2.1]-2-hepten-5-yl 2,3-dihydroxypropyl ether, bicyclo[2.2.1]-2-hepten-5-yl 2,2-dimethylol - 3 - hydroxypropyl ether, bicyclo[2.2.1]-2-hepten-5-yl, 5,6-dihydroxyhexyl ether, bicyclo[2.2.1]-2-hepten-5-yl 3 - methylol - 5 - hydroxypentyl ether, bicyclo[2.2.1]-2-hepten-5-yl 7,8-dihydroxyoctyl ether, and the like.

The fourth class of polyhydric alcohols which can be employed to produce the polyether-polyols of the invention comprises the compounds which are represented by Formula VIII:

VIII) 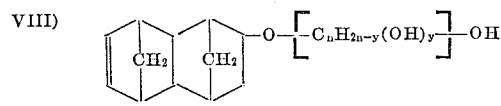

wherein $n$ represents an integer having a value of from 3 to 8, and wherein $y$ is one or two. These polyhydric alcohols can be prepared by effecting a Diels-Alder type addition between cyclo-pentadiene and a polyhydric alcohol that is represented by Formula VII, supra. Representative examples of the polyhydric alcohols contemplated by Formula VIII supra, include, among others, tetracyclo[6.2.1$^{1,8}$.1$^{3,6}$.0$^{2,7}$]-4-dodecen-9-yl 2,3-dihydroxypropyl ether, tetracyclo[6.2.1$^{1,8}$.1$^{3,6}$.0$^{2,7}$]-4-dodecen-9 - yl 2,2-dimethylol-3-hydroxypropyl ether, tetracyclo[6.2.1$^{1,8}$.1$^{3,6}$.0$^{2,7}$]-4-dodecen-9-yl 5,6-dihydroxyhexyl ether, tetracyclo[6.2.1$^{1,8}$.1$^{3,6}$.0$^{2,7}$]-4-dodecen-9-yl 7,8-dihydroxyoctyl ether, and the like.

The above-described polyether-polyols are prepared by heating, in the presence of an acid catalyst, one or more of the polyhydric alcohols which are represented by Formula III supra. The catalysts which are employed in this polymerization reaction are the Lewis acids, in particular the mineral acids, the aryl-sulfonic acids, and certain metallic halides which are known in the art as Friedel-Crafts catalysts. Among the acid catalysts which are contemplated include, for example, sulfuric acid, perchloric acid, phosphoric acid, phosphorous acid, hydrochloric acid, benzenesulfonic acid, toluenesulfonic acid, boron trifluoride and the etherate and aminate complexes thereof, stannic chloride, aluminum chloride, titanium tetrachloride, ferric chloride, and the like. Boron trifluoride and its complexes with ethers, particularly diethyl ether, are preferred. The catalyst is employed in catalytically significant amounts, for example, from about 0.05 to about 5 weight percent, and preferably from about 0.4 to about 4 weight percent, based upon the weight of the starting polyhydric alcohol.

The polymerization reaction is conducted by admixing one or more of the polyhydric alcohols that are represented by Formula III supra, with a catalytically significant amount of an acid catalyst, and heating the admixture for a period of time sufficient to polymerize the starting alcohol and thereby produce the polyether-polyol of this invention.

The temperature at which the polymerization reaction is conducted can vary over a wide range, for example, from about 60° C., and lower, to about 150° C. and higher. The preferred temperature range is between about 50° C. and about 120° C. The reaction time is dependent, in part, upon such factors as the degree of polymerization desired, reaction temperature, nature of the starting polyhydric alcohol and catalyst, concentration of the catalyst, and the like, and will therefore vary over a wide range. For example, a suitable reaction time is normally found in the range of from about 1 hour to about 30 hours, and preferably about 4 hours to about 25 hours.

At the completion of the reaction, it may be desirable to neutralize the catalyst by adding an equivalent amount of a base, for example, an alkali metal hydroxide, carbonate or bicarbonate.

The polymerization reaction can be conducted via the bulk, solution, or suspension routes. When the reaction is carried out in the presence of an inert, normally-liquid organic vehicle, the vehicles which can be employed include, for example, the saturated aliphatic and the aromatic hydrocarbons such as benzene, toluene, xylene, cyclohexane, hexane, heptane, various petroleum fractions, and the like; the organic ketones such as methyl isobutyl ketone, diisobutyl ketone, and the like; the organic ethers such as diisopropyl ether, and the like; and the organic esters such as butyl acetate, amyl acetate, and the like. The concentration of the reactants in the diluent is not critical and can be varied widely, for example, from about 5 to about 90 weight percent, based upon the total weight of the reaction mixture.

The polymerization reaction can be carried out in conventional equipment, such as a reaction kettle equipped with agitator and conventional heat transfer means. The equipment can be constructed from standard materials such as glass, steel, stainless steel, copper, aluminum, Monel, and the like.

The pressure at which the polymerization reaction is conducted is not critical, and it can be subatmospheric, atmospheric, or superatmospheric.

The polyether-polyol product can be recovered by conventional methods, for example, by neutralization of the catalyst followed by distillation of any inert diluent which is present. In some cases, it will be desirable to leave the polyether-polyol in solution in order to facilitate further processing.

The polyether-polyols that are employed in the invention have the recurring unit represented by Formula I:

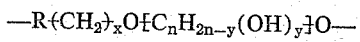

wherein the several variables are described above. The discussion with respect to Formula IV above has described several of the terminal groups that can be present on the polymeric chain. It is also contemplated that the polyether-polyols can have other terminal groups. For instance, by employing substantially the same reaction conditions described above for the production of polyether-polyols, either bicyclo[2.2.1]-2,5-heptadiene or tetracyclo[6.2.1$^{1,8}$.1$^{3,6}$.0$^{2,7}$]-4,9-dodecadiene can be reacted with a polyol having three or more hydroxyl groups to produce useful polyether-polyols that are within the scope of Formula I. The following reactions are illustrative:

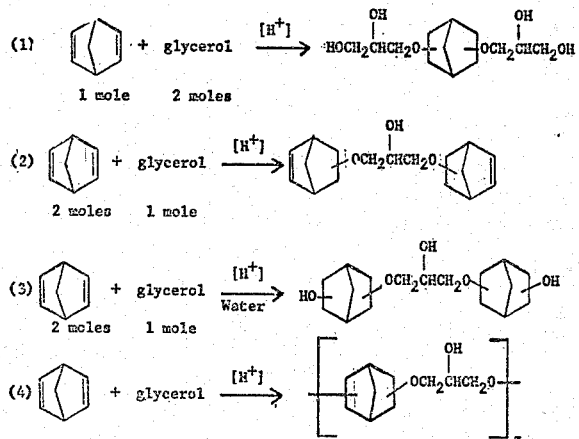

wherein z is a number having an average value up to about 50. In addition to glycerol, any polyol having three or more (preferably from three to four) hydroxyl groups and having up to, for instance, eight carbon atoms, can be employed. Specific illustrative examples include glycerol, pentaerythritol, 1,2,6-hexanetriol, 1,2,4-butanetriol, and the like. The molar proportion of the reactants can vary widely, although usually from about 0.5 to about 2 moles of polyol will be employed per mole of the cyclic diene.

The polyether-polyols that are employed in the invention can be described as being substantially linear polymers that contain at least one and preferably at least two, up to about 50 bicyclo[2.2.1]-2,5(6)-heptylene or tetracyclo[6.2.1$^{1,8}$.1$^{3,6}$.0$^{27}$]-4,9(10)-dodecylene moieties in the polymeric chain, said moieties being interconnected the ―(CH$_2$)$_x$O―[C$_n$H$_{2n-y}$(OH)$_y$]O― group (the variables $x$, $n$, and $y$ having been defined above), and wherein the linear chain is terminated by HO―R―, R'―, or ―R―(CH$_2$)$_x$O―[C$_n$H$_{2n-y}$(OH)$_y$]OH groups (the variables R, R', $x$, $n$, and $y$ having been defined above). For clarification, it is pointed out that, for instance, the group

(said group being one of the definitions for R') is intended to be within the meaning of "bicyclo[2.2.1]-2,5(6)-heptylene moiety."

The present invention relates to the aliphatic monocarboxylic acid esters of the above described polyether-polyols. The invention embraces both the fully esterified and the partially esterified polyether-polyols, which can be prepared by standard esterification techniques. For example, the desired proportion of aliphatic monocarboxylic acid and polyether-polyol is charged to a reactor equipped with agitator, conventional heat transfer means, nitrogen inlet means, and reflux condenser. If desired, a small amount of a solvent such as xylene is added to the reaction mixture in order to facilitate separation of water, i.e., by azeotropic separation. The esterification can be carried out at a temperature between about 100° C. and 300° C., and preferably between about 150° C. and 275° C. The reaction time is dependent, in part, upon such factors as reaction temperature, degree of esterification desired, nature of reactants, and the like, but in general will be between about one hour and twenty hours, and preferably from about four to about twelve hours. The esterification can be catalyzed to accelerate the reaction. Materials suitable for use as catalysts include alkalis such as potassium hydroxide and sodium hydroxide, arylsulfonic acids such as benzenesulfonic acid and toluenesulfonic acid, and the like. An effective catalyst concentration is normally from about 0.05 to about 3 weight percent, based upon weight of the reactants.

In general, the aliphatic monocarboxylic acids can be employed in the esterification reaction. The preferred acids are those which contain from one to about twenty carbon atoms, and include both saturated and unsaturated acids such as formic acid, acetic acid, propionic acid, butyric acid, valeric acid, caproic acid, heptoic acid, caprylic acid, nonylic acid, capric acid, undecylic acid, lauric acid, tridecylic acid, myristic acid, pentadecylic acid, palmitic acid, margaric acid, stearic acid, oleic acid, linoleic acid, linolenic acid, eicosanic acid, palmitolic acid, ricinoleic acid, hexadienoic acid, and the like. For purposes of economy it is advantageous to employ mixtures of acids derived from natural sources such as castor oil, dehydrated castor oil, coconut oil, cottonseed oil, linseed oil, menhadin oil, oiticica oil, olive oil, perilla oil, safflower oil, sardine oil, soybean oil, tall oil, tung oil, and the like. It is particularly preferred to employ the acids derived from drying oils for the esterification. When such particularly preferred acids are employed, the resultant ester is curable by air oxidation, heat treatment, or the like, to infusible, insoluble compositions having utility as surface coatings.

In most cases, the aliphatic monocarboxylic acid reacts not only with the alcoholic hydroxyl groups present in the polyether-polyol, but also with the unsaturation present in

or

groups. The acid adds across the double bond to form an ester group, for instance.

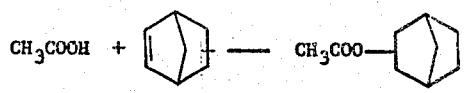

A still further aspect of the invention relates to curable compositions which comprise (1) a drying oil acid ester of the polyether-polyol, and (2) a drier. Examples of the drying oil acids here contemplated include linseed oil acids, soybean oil acids, dehydrated castor oil acids, tung oil acids, tall oil acids, and the like. The driers employed are, for example, the metallic salts of organic acids such as lead octoate, cobalt naphthenate, lithium naphthenate, manganese octoate, and the like, such as are well known in the art. The drier is employed in catalytically significant amounts, usually such that there is present from about 0.01 to about 1.5 weight percent of metal, based on the weight of the ester. The curable compositions of the invention are useful to prepare surface coatings, and as such are normally applied from solution. Suitable solvents include aromatic and aliphatic hydrocarbons such as xylene, toluene, benzene, cyclohexane, various petroleum fractions such as V.M. and P. naphtha, and the like, ketones such as methyl isobutyl ketone, diisobutyl ketone, and the like, and others. The particular solvent or mixture of solvents employed and the concentration of the ester in the same depend upon the coating method used. The adjustment of these variables is well known in the surface coatings art. After application to the substrate, the curable coating compositions are air-dried to remove solvent. Hardening or curing of the coating can be effected by air oxidation alone, or it can be accelerated by application of heat. Baking temperatures of from 100° C. to about 200° C. for from about one-half to about two hours are usually sufficient to cure the coating. Surface coatings prepared from the curable compositions of the invention have good adhesion to metal, for example, steel and aluminum.

The following examples illustrate the practice of this invention.

EXAMPLE 1

To a 3-liter high pressure reactor, there were added 488 grams (4.0 moles) of the monoallyl ether of glycerine and 264 grams (2.0 moles) of dicyclopentadiene. The resulting mixture was heated to 200° C. for four hours during which period of time the pressure dropped from about forty to zero p.s.i.g. The resulting reaction product was subjected to distillation and there was recovered a 250-gram center cut (boiling point 133–135° C. at 2.8 millimeters of mercury absolute pressure). This material had a hydroxyl value of 16.8 (theory, 17.2) and, upon analysis, was composed of 67.2 percent carbon, 9.2 percent hydrogen and 24.2 percent oxygen (theory: 66.7 percent carbon, 9.1 percent hydrogen, and 24.2 percent oxygen). The product was identified as bicyclo[2.2.1]-2-hepten-5-ylmethyl 2,3-dihydroxypropyl ether. The infrared spectrum was consistent with this identification.

EXAMPLE 2

Five grams of the bicyclo[2.2.1]-2-hepten-5-ylmethyl 2,3-dihydroxypropyl ether prepared in Example 1 was placed in a glass test tube. To the test tube was then added 0.025 gram of sulfuric acid, and the catalyzed ether was then heated at 80° C. for 4 hours and at 120° C. for 21 hours. The resulting polymeric product was a highly viscous, dark liquid.

EXAMPLE 3

Five grams of the bicyclo[2.2.1]-2-hepten-5-ylmethyl 2,3-dihydroxypropyl ether prepared in Example 1 was placed in a glass test tube. To the test tube was then added 0.025 gram of boron trifluoride, and the catalyzed ether was then heated at 80° C. for 4 hours and at 120° C. for 21 hours. The resulting polymeric product was a highly viscous, amber liquid.

EXAMPLE 4

Five grams of the bicyclo[2.2.1]-2-hepten-5-ylmethyl 2,3-dihydroxypropyl ether prepared in Example 1 was placed in a glass test tube. To the test tube was then added 0.025 gram of hydrochloric acid, and the catalyzed ether was then heated at 80° C. for 4 hours and at 120° C. for 21 hours. The resulting polymeric product was a highly viscous, yellow liquid.

EXAMPLE 5

To a 250 milliliter flask equipped with stirrer, thermometer, and reflux condenser, there were charged 50 grams of the product of Example 1 and 10 grams of xylene. The solution was heated to 50° C. Two grams of boron trifluoride etherate dissolved in 15 grams of xylene was then added to the flask. A mild exotherm followed. After 5 hours at 50° C. and 4 hours at 80° C., the mixture was cooled and 0.4 gram of sodium hydroxide was added to neutralize the catalyst.

To this solution 48.4 grams of soybean oil acid was added, and the mixture was heated to 250° C. for ten hours. At this point, the reaction mixture had an acid number of 7.3 and heating was discontinued. A film was cast on an aluminum substrate from the reaction mixture, to which had been added about 0.5 weight percent of cobalt naphthenate drier, based on weight of cobalt metal per weight of the esterified product. The resulting film was air dried for about 0.5 hour, and then heated in an oven at 160° C. for 1.5 hours. The resulting yellow film was tough, flexible, and had good adhesion to the substrate.

EXAMPLE 6

*Polyether from glycerine and bicyclo[2.2.1]-2,5-heptadiene*

To a mixture of 123 g. (1.33 moles) of glycerine and 1 ml. of 70% perchloric acid was added dropwise over a 6-hour period 92 g. (1 mole) of bicyclo[2.2.1]-2,5-heptadiene at 100–105°. After an additional 8 hour reaction period at 110° there was obtained a very viscous brown polyhydroxyether whose infrared spectrum was compatible with the structure:

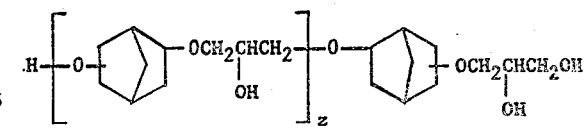

The above examples serve to illustrate the practice of the invention. Variations can be made in accordance with the teachings in the specifications, without departing from the spirit of the invention.

What is claimed is:

1. An aliphatic monocarboxylic acid ester of a polyether-polyol that is characterized by the recurring structural unit of the formula:

wherein R represents a divalent radical that is selected from the group consisting of bicyclo[2.2.1]-2,5(6)-heptylene and tetracyclo[6.2.1$^{1,8}$.1$^{3,6}$.0$^{2,7}$]-4,9(10)-dodecylene; wherein $x$ represents an integer having a value of from zero to one; wherein $n$ represents an integer having a value of from 3 to 8; wherein $y$ represents an integer that has a value of from one to two; and wherein said acid is derived from a drying oil.

2. An ester of claim 1 wherein the said recurring structural unit has the formula:

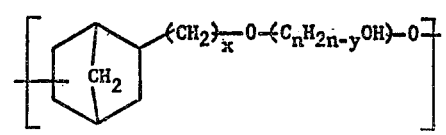

wherein $n$ represents an integer having a value of from 3 to 8, and wherein $x$ represents an integer having a value of zero or one.

3. An ester of claim 2 wherein $n$ is 3.

4. A curable composition comprising an ester of claim 1 and a catalytically significant quantity of a drier.

No references cited.

HENRY R. JILES, *Primary Examiner.*